UNITED STATES PATENT OFFICE.

DONALD D. CATTANACH, OF PROVIDENCE, RHODE ISLAND.

IMPROVEMENT IN TREATING OILS FOR PAINTS, &c.

Specification forming part of Letters Patent No. 146,044, dated December 30, 1873; application filed August 11, 1873.

*To all whom it may concern:*

Be it known that I, DONALD D. CATTANACH, of the city and county of Providence, in the State of Rhode Island, have made certain discoveries in the Treatment of Linseed and kindred Oils for useful purposes, and in the art of converting such oils into an elastic gum; and I declare the following to be a description thereof.

This invention consists in the production of a gum or gum-like substance from linseed-oil or kindred oils by a process of treatment involving mainly the exposure of the oil to air and light, accompanied by frequent and continued agitation or stirring of the oil during such exposure, with or without a preliminary purification of the oil so treated.

The process of purification is not indispensable, but I prefer it for many purposes. I shall, therefore, first describe the purifying operation, and then the process by which this purified oil, as well as oil not thus preliminarily purified, may be converted into the gum or gum-like substance that is the main object of my invention.

I take a good quality of raw linseed-oil of commerce, and wash it thoroughly by placing with the oil, in a vessel, about an equal quantity of rain-water or distilled water, and keeping the mixture agitated by stirring. This should be done in a warm place—in a temperature, say, of about 70° Fahrenheit or upward. After the stirring has continued some time, the mixture will assume a milky appearance. Continue the agitation for several days, say from three to five, and then allow the mixture to settle. The water, after settling, will appear milky, with more or less whitish sediment at the bottom of the oil. One washing, as above described, will for most purposes be sufficient; but if the best results are desired, the water should be renewed and the washing repeated until the water comes clear after separating from the oil by settling. The length of time required will depend largely upon the rapidity of the stirring, so as to bring the water in contact with every portion of the oil in the minutest divisions. The proportion of water to oil may, of course, vary somewhat, according to convenience.

After this process, I subject the oil to further treatment, for the removal of acids and moisture, by the use of lime or carbonate of lime. Placing the oil in a vessel, I immerse it in a water-bath, and bring the water to the boiling-point. I then introduce the lime into the oil-vessel, and allow it to remain a sufficient time to act upon the whole mass of the oil, and until the oil becomes of a clear amber color. The vessel containing the oil is then removed from the water-bath, and, after settling, the oil is drawn off. The quantity of lime is easily judged of by persons skilled in the preparation of oils for fine qualities of paint.

The oil is then treated with a solution of vinegar of lead, in the following manner: Eighteen (18) ounces of neutral acetate of lead are dissolved in about four and a half (4½) pints of rain-water. When the solution is complete, about eighteen (18) ounces of litharge are added. The whole is allowed to stand in a moderately warm place, and kept frequently agitated to aid the solution of the litharge. This solution may be considered complete when no more of the small bright scales are apparent.

I am not confined to the above proportions, but have found that those now given work most economically.

The solution of vinegar of lead or tribasic acetate of lead thus formed is sufficient for the preparation of about twenty-two (22) pounds of the oil. For this purpose the solution is diluted with about an equal volume of rain-water, and the oil is slowly poured into it, accompanied with constant agitation, and having had previously mixed with it about eighteen (18) ounces of litharge. This mixture should be kept in a warm place and frequently stirred, the oftener the better, to insure the action of the solution upon every portion of the oil. Several days will ordinarily be required. The action will be sufficiently complete when the oil, being allowed to rest and rising to the top, presents a limpid, straw-colored appearance. A copious whitish deposit will be found at the bottom of the oil.

At this stage another application of lime, in the manner above described, will be beneficial, although not necessary unless very perfect results are required.

The oil thus purified is then placed in shallow vessels and exposed to the rays of the sun.

While in these vessels the oil must be sufficiently agitated, night and day, to prevent the formation of any skin upon the surface; but this agitation should be so conducted as to interfere as little as possible with the action of the sun's rays, and should not be so violent as to cause bubbles or froth to rise on the top of the oil to obstruct the action of the sun. The passage of an agitator slowly through the mass of the oil, so as to stir the whole in its passage, once in every ten or fifteen minutes, increasing in frequency to once in every five or ten minutes as the mass gradually thickens, will be sufficient, allowing the oil to repose in the intervals.

If it should become necessary to discontinue the agitation for any considerable time, the formation of a skin may be prevented by inclosing the oil in an air-tight vessel.

This exposure in the manner described is continued until the oil assumes a whitish or very pale amber color, appearing like very clear olive-oil, and becomes somewhat thickened, the darker amber or straw color having disappeared. The length of time required will obviously depend very largely upon the state of the weather and the depth of the oil. I have found that from two to four days in clear, sunny weather in summer is ample. The depth of oil in these vessels should be slight, say from half an inch to two inches.

The sunning process having been completed, the oil must now be subjected to further agitation, during which it is exposed to the air and the daylight. For this purpose I prefer to remove it from the shallow vessels and place it in a deeper vessel, which I call the "agitator," where it is agitated and mixed day and night. Here a very important change gradually takes place. The clear, limpid fluid oil, by degrees, assumes the consistency of thick dough, and, if the process is carried further, becomes more and more solid; and, as the process continues, the gradual application of artificial heat becomes necessary to render the working practicable. As the solidity or density increases, it becomes tough, stringy, and elastic, and presents shiny surfaces as it is drawn out in the process of working, accompanied by cracking sounds, and presenting generally the same phenomena as rubber under similar treatment.

The stirring and mixing of the gradually-thickening oil can be performed, as may readily be supposed, in a variety of ways and by a variety of means, the object being to keep it continually turning and presenting new portions to the action of the air and light, in order that all parts may, as nearly as possible, be thereby acted on alike.

The heat to be applied in this part of the process may be carried as high as 200° Fahrenheit, although from 100° to 150°, or even less, will be sufficient in most cases. Too much heat, however, tends to darken the color of the gum and thus injure it for some purposes, such as light-colored varnishes. When, under about the above heat, the gum becomes of the consistency of very thick, tough flour-dough, and elastic, so that when a ball of it is taken from the agitator and pressed with the finger, after cooling, it will gradually return to its original form, it may be considered as sufficiently stirred.

There is no exact point at which the agitation must cease, but it is to be carried to a greater or less extent, according to the purpose to which the gum is to be applied. Long-continued mixing, rendered practicable by the higher degree of heat, renders the gum more valuable for the higher qualities of varnishes and paints. After bringing the gum to the desired consistency, I remove it from the agitator, and press or roll it out into thin sheets, say from one-sixteenth of an inch to half an inch in thickness. These sheets I place on racks and expose them to the air and sun's rays, and allow them so to remain for further use. The bleaching which the gum undergoes by this exposure helps to remove any discoloration it may have received from the heat in the agitator, and also to remove any unctuousness that may be remaining. It may remain here any desired length of time. When the gum in sheets, as described, is required for use, it can readily be brought into solution by the use of benzole, wood-spirits, ether, and the like solvents. Such solution will be hastened by the application of artificial heat, and takes place very slowly without it.

The whole process which I have now described is the one which I prefer for producing the best quality of gum. By this means I obtain an article of a very clear, light color, impervious to water, flexible, elastic, substantially unaffected by acids, except at high temperatures, and capable of resisting, without injury, the natural extremes of heat and cold, possessing very rapidly-drying properties, as shown by its solutions, and a smooth polished surface without varnish or dressing of any kind.

A gum may, however, be formed of less purity by a sufficient agitation in the manner already described, without the various preparatory steps detailed above, or after the employment of any one or more of them. A much longer period of time for agitation will, however, be necessary to effect the change, as each of the preparatory steps helps to hasten the result in the agitator.

Boiled oil will be converted into gum sooner than raw oil, but the gum will not have the same clearness of color nor so much elasticity.

It is to be remarked that, in place of the treatment with vinegar of lead before described, the infusion of free oxygen into the oil at any part of the process before it begins to change into the solid state will have a similar effect. The gum can be produced in the agitator by the presence of free oxygen accompanied by agitation, without the presence of air or sunlight; or, by providing the agitator with a glass cover, the light may be admitted to act in conjunction with the gas and the agitation. The action of light is not essential to the production of the gum in the agitator; but I prefer to employ light, as before described, as a lighter shade of gum is obtained thereby.

Besides linseed-oil, any of the other drying-oils, known and used among painters as such, can likewise be converted into a similar gum by the means above described for the management of linseed-oil. I would not, however, be understood to say that all of the drying-oils are of equal utility for this purpose. I consider linseed-oil among the best.

Many useful results are obtained at various stages of this process, and before it is finally completed. For example, when the oil in the agitator has reached to about the consistency of a fat oil, it constitutes, without any further preparation, a very perfect gold size, and, as soon as it arrives at a plastic doughy state, it is well adapted for the making and mixing of all the more ordinary varnishes and paints, and for such purposes it is preferable to take it at about this stage, as it is then readily soluble in rectified turpentine, such solution being employed in the same way as boiled oil, and with or without the addition of other gums.

The gum or gum-like substance made under my invention differs in essential respects from any other body heretofore produced from oils of the kind referred to. It comes from the agitator a mass of uniform consistency throughout, homogeneous, cohesive, flexible, adhesive, and elastic. It is unlike oil when dried into skins in the ordinary way, especially in the qualities of adhesion and cohesion, which latter qualities require to be supplied to such skins by the addition of some foreign body before they can be spread upon fabrics successfully, for a water-proof coating, for example, while my gum can be applied to cloth for a water-proof coating just as it comes from the agitator, by means of hot spreaders or other suitable devices. Thus applied it adheres equal to any known water-proof coating. If the gum is exposed to air and light after completion in the agitator, it retains its characteristic properties for a long time, and by the employment of a suitable solvent it can be reduced to the proper consistency for spreading, or for the preparation of varnishes and the like the same as before.

What I claim, and desire to secure by Letters Patent, is—

1. The process of treating linseed-oil, and kindred oils, for the purposes stated, by subjecting the oil to agitation in the presence of air, or light and air, or the specified equivalent oxidizing agent, in the manner described, with or without the preliminary purification of said oil, as set forth.

2. The gum or gum-like substance made from linseed-oil or kindred oils, substantially in the manner and by the process described.

DONALD D. CATTANACH.

Witnesses:
L. O. ROCKWOOD,
G. F. WHIPPLE.